United States Patent Office 3,007,969
Patented Nov. 7, 1961

3,007,969
PROCESS FOR PREPARING TETRA-HYDROXY-METHYL PHOSPHONIUM HYDROXIDE
Martin Reüter and Ludwig Orthner, Frankfurt am Main, Germany, assignors to Farbwerke Hoechst Aktiengesellschaft vormals Meister Lucius & Brüning, Frankfurt am Main, Germany, a corporation of Germany
No Drawing. Filed Jan. 7, 1958, Ser. No. 707,475
Claims priority, application Germany Jan. 12, 1957
7 Claims. (Cl. 260—606.5)

It is known that phosphine cannot be reacted with aldehydes, for instance with a neutral formalin solution, in the absence of acids (N. L. Paddok, Chemistry and Industry 1955, page 901). Only when hydrohalic acids are added does the reaction take place, whereby tetra-hydroxy-alkyl phosphonium halides, for instance $[(HOCH_2)_4P]Cl$ (Hoffmann, Journ. Am. Chem. Soc. 1921, page 1684), and $[(CH_3CH(OH))_4P]Br$ (Messinger, Ber. 21, page 334), are formed. It is further known to prepare tetra-hydroxymethyl-phosphonium hydroxide by reacting metal phosphides with aldehydes in an acid medium. This process, however, shows the disadvantage that the reaction solutions contain large amounts of metal salts which, particularly when isolating the phosphonium hydroxide serving as a basis, have to be removed by precipitations and filtrations causing a loss of time.

Now, we have found that tetra-hydroxy-methyl-phosphonium-hydroxide can be produced by reacting 1 mol of formaldehyde, favorably in the presence of water, with ¼ mol of phosphine in the presence of slight amounts of finely distributed metals (except those belonging to the group of alkali metals or alkaline earth metals), and/or their compounds which are capable of reacting with phosphine, and/or their phosphine reaction products or in the presence of slight amounts of solid metalloids of the 3rd to 7th group of the periodic system, and their compounds and/or of their phosphine reaction products.

As metals and solid metalloids active in the reaction of the process of the present invention there enter into consideration particularly such whose phosphides, as generally known, do not react or only slowly react with water or acids (cf. Kirk-Orthner, Encyclopedia of Chemical Technology, vol. X (1953), pages 458–459).

The metals may belong to the first to eighth group of the periodic system. For instance, there are suitable for the process of the present invention the halides, sulfates, and nitrates of copper, zinc, aluminum, cerium, thallium, titanium, tin, lead, vanadium, bismuth, chromium, uranium, manganese, and, before all, of iron, cobalt, nickel and cadmium soluble in water or in organic solvents; particularly suitable are the halides and hydroxides of the precious metals, for instance mercury, silver, platinum or palladium halides. As finely distributed metals there come into consideration for instance intensely stirred mercury, platinum black, nickel on pumice; as double salts alums of aluminum, iron, chromium; as complex salts for example potassium-palladium-II-chloride and potassium-platinum-II-chloride. As metal oxide chromium-trioxide is mentioned, also in the form of a salt, for instance potassium chromate. Mixtures of the metals and their compounds or their phosphine reaction products can also be used.

As solid metalloids there come into consideration for the reaction according to the process of the invention the elements of the 3rd to 7th group of the periodic system or their compounds or their phosphine reaction products. There are mentioned as examples iodine, arsenic-III-chloride, hydrofluoboric acid, hydrofluosilicic acid, antimony-III-chloride, sulfur monochloride, hypophosphorous acid, selenium dioxide.

In particular, the catalysts of the invention may be:

(a) The metals of groups IIb and VIII of the periodic system,
(b) The oxides and the hydroxides of the metals and solid metalloids of groups Ib, IIb, IIIb, IVa, IVb, Va, Vb, VIa and VIII of the periodic system,
(c) The soluble salts and complex salts of the metals and solid metalloids of groups Ib, IIb, IIIb, IVa, IVb, Va, Vb, VIa and VIII of the periodic system with hydrohalic acids, nitric acid, and sulfuric acid,
(d) Uranyl acetate,
(e) The phosphides of the metals and metalloids of groups Ib, IIb, IIIb, IVa, Va, Vb, VIa and VIII of the periodic system, obtained by the reaction of the aforesaid oxides, hydroxides and salts, including uranyl acetate, with phosphine, and
(f) Mixtures of the aforesaid phosphides and the aforesaid salts.

References to the periodic table refer to the periodic table according to Lothar Meyer and Mendelyeev, as shown, for example, in Table 2, page 12 of the "Chemiker-Kalender," Part 3, 52nd edition, Julius Springer Verlag, Berlin (1931).

The aforementioned metals and solid metalloids or their compounds reacting with phosphine and the phosphine reaction products are generally used in fine distribution. They may also be used in the form of precipitates on carriers such as kieselguhr or pumice. It is also possible to use them in colloidal form, and it is of advantage to use them in the form of compounds more or less soluble, such as salts, for instance halides, sulfates, nitrates, double salts, basic salts, hydroxides and perhaps also complex salts or oxides, as far as they can be reacted with phosphine. Generally, the metals and metalloids mentioned above or their compounds are altered by the phosphine in the course of the reaction, i.e. they obviously react with the phosphine in a manner not yet known exactly. Furthermore, it has been found that phosphine reaction products with finely dispersed metals or in particular their compounds as well as thermally produced phosphides of metals or appropriate solid metalloids may catalyze the reaction of the phosphine with the formaldehyde. Phosphides can likewise be used in the form of precipitates on carriers such as kieselguhr or pumice or in colloidal form.

The above-mentioned metals, metalloids or their compounds or their phosphine reaction products are used in a concentration of 0.1–10% by weight, preferably of 0.5–2% by weight, referred to the final reaction mixture.

The weakly exothermic reaction is favorably performed in the presence of water, if necessary with addition of water-soluble organic solvents, such as low aliphatic alcohols or cyclic ethers, for instance ethanol or dioxane, at an ordinary, slightly reduced or elevated temperature, i.e. between about $-10°$ C. and $+40°$ C., if necessary under pressure and with intense stirring in order to secure a fine distribution of the introduced phosphine.

Before the reaction is started, the pH value of the mixture of formaldehyde, which can also be used in a polymeric form as paraformaldehyde, and of the catalyst amounts to about 4–8 according to the nature of the catalyst used. When phosphine is introduced, the pH value rises to about 8 to 8.5.

Relatively concentrated solutions of tetra-hydroxy-methyl-phosphonium-hydroxide can be prepared by reacting at first formalin of 40% strength with phosphine in the presence of a metal salt in order to obtain a moderately concentrated solution to which solid paraformaldehyde as well as a further amount of phosphine are added. By the dissolution of the paraformaldehyde a more concentrated solution of tetra-hydroxy-methyl phosphonium hydroxide is obtained.

Per 1 mol of formaldehyde ¼ mol of phosphine is introduced. Phosphine is produced in known manner from alkali metal phosphides and alkaline earth metal phosphides, from elementary phosphorus and other phosphorus compounds. In order to reach a complete absorption, the velocity of introduction must be adapted to the varying efficiency of the catalyst used in each case.

The products obtained by the process of the invention and showing a weak alkaline reaction most probably show the constitution of the tetra-hydroxy-methyl phosphonium hydroxide, which hitherto could be produced only in a very roundabout manner from the corresponding salts. After filtration—often favorably with addition of animal charcoal or kieselguhr—the products are obtained as colorless aqueous or organic solutions and can be isolated therefrom by concentration, advantageously under reduced pressure, as viscous oils solidifying in the cold. They are used as pesticides, additives for lubricating substances, flame proofing agents for textiles and wood and as intermediate substance for such products, since they can easily be transformed by means of acids into solid or oily saltlike compounds soluble in water or organic solvents, or by means of heavy metals, particularly heavy metal halides, into solid complex compounds.

The following examples serve to illustrate the invention but they are not intended to limit it thereto.

*Example 1*

300 grams of formalin of 30% strength are made to a paste by stirring with 1 gram of mercury-II-chloride and 25 grams of phosphine are introduced into this solution within 8–10 minutes. The reaction is performed with weak spontaneous heating, the temperature being maintained at about 35° C. by slight cooling. The weakly alkaline reaction solution (pH value about 8.5) is liberated by filtration from the small amount of precipitate suspended therein and the colorless filtrate is concentrated by evaporation under reduced pressure at about 30° C. 120 grams of an organic phosphorus compound are obtained as a colorless, viscous oil which is very easily soluble in water, while showing a weak alkaline reaction (pH about 8.5). The oil is likewise soluble in methanol and ethanol, but sparingly soluble in ether, benzene and methylene chloride.

Instead of using mercury-II-chloride it is also possible to use with the same success 1 gram each of silver nitrate, silver hydroxide, iron-III-chloride, cobalt-II-chloride, nickel-II-chloride, chromium-III-sulfate, cadmium chloride, or 0.5 gram of finely distributed nickel, precipitated on pumice.

Furthermore, it is possible to use 1 gram of intensely stirred mercury metal or the same amount of mercury-I-chloride, aluminum chloride, tin-IV-chloride, copper sulfate, manganese-II-chloride, titanium-III-chloride, lead-II-chloride, bismuth-III-chloride, gold-III-chloride, zinc-chloride, cerium-III-chloride, thallium-chloride, vanadyl-chloride (VOCl$_2$), uranyl-acetate, ferro-sulfate, potassium bichromate, thermally produced aluminum phosphide, potassium permanganate, iridium-III-chloride or 0.5 gram of platinum black.

The absorption of phosphine takes place most rapidly, advantageously at 0° C. with good cooling, when 0.5 gram each of platinum-IV-chloride, palladium-II-chloride, potassium-platinum-II-chloride, platinum-IV-hydroxide in colloidal form, palladium-II-hydroxide, rhodium-III-chloride, or 0.2 gram of platinum-II-chloride or a mixture of 0.3 gram of potassium-platinum-II-chloride and 0.5 gram of iron chloride.

Preformed reaction products of metal compounds and phosphine can likewise be added to the formaldehyde. For instance, phosphine can be introduced into an aqueous solution of 20% strength of 1 gram of cadmium chloride which has been adjusted to a pH value of about 8 by means of a little ammonia solution, or into an aqueous solution of 10% strength containing 0.5 gram of palladium chloride, and the white-turbid or black-turbid suspension can be added to the formalin and ¼ mol of phosphine can then be introduced. It is often likewise possible to decant the insoluble precipitates of the catalyst of the reaction mixture which often separate, for example that formed from potassium-platinum-II-chloride, and to use them again for the catalysis of the reaction of fresh formaldehyde and phosphine. They show then the same efficiency.

When reacting the reaction products with 1 mol each of hydrochloric acid, acetic acid and hydrofluoric acid and subsequently concentrating to dryness under reduced pressure, the known tetra-hydroxy-methyl-phosphonium-chloride or the acetate and fluoride are obtained in a very good yield. Furthermore, by reaction with 0.5 mol of oxalic acid the neutral oxalate was produced which melts at 96° C. The picrolonate which is sparingly soluble in water melts at 169° C. (after recrystallization from isopropanol).

When reacting with 1 mol of mercury-II-chloride in alcoholic solution, a white product is formed which is insoluble in water and alcohol, melting at 140° C. and showing the analytical composition

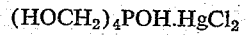
(HOCH$_2$)$_4$POH.HgCl$_2$

When operating in this way, the hitherto unknown tetra-hydroxy-methyl-phosphonium-hydroxide

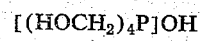
[(HOCH$_2$)$_4$P]OH will probably be obtained as reaction product.

*Example 2*

120 grams of para-formaldehyde are stirred in a mixture of 100 grams of acetonitrile and 100 grams of water; 0.5 gram of platinum-IV-chloride are dissolved therein and through a frit 34 grams of hydrogen phosphide are introduced within 6 hours at an ordinary temperature. The hydrogen phosphide is completely absorbed with weak spontaneous heating, whereby the para-formaldehyde is gradually dissolved and the pH value of the solution rises to about 8.2. After concentration under reduced pressure 170 grams of oily tetra-hydroxy-methyl-phosphonium-hydroxide are obtained.

*Example 3*

More concentrated solutions of tetra-hydroxy-methyl-phosphonium-hydroxide are obtained in the following manner:

34 grams of hydrogen phosphide are introduced through a frit with stirring and outside cooling to about 10° C. into 300 grams of formalin of 40% strength, in which 1 gram of cadmium chloride has been dissolved. Instead of using a stirring vessel the reaction can be performed in such a manner that the formalin is flowing in countercurrent to the hydrogen phosphide over a trickling column and is then pumped.

A still more concentrated solution is obtained by adding to the solutions of the tetra-hydroxy-methyl-phosphonium-hydroxide obtained as described above 120 grams of paraformaldehyde and introducing, while stirring, further 34 grams of hydrogen phosphide, whereby the paraformaldehyde is dissolved with formation of a further mol of the quaternary base.

*Example 4*

300 grams of formalin of 30% strength are stirred with 1 gram of arsenic-III-chloride and 25 grams of phosphine are introduced into this mixture at an ordinary temperature in the course of about 8–10 hours. The reaction is performed with weak spontaneous heating, the temperature being maintained at about 35° C. by slight cooling. The weakly alkaline reaction solution (pH about 8.5) is freed from the small amount of precipitate suspended therein by filtration and the colorless filtrate is evaporated under reduced pressure at about 30° C. 120 grams of an organic phosphorus compound are obtained as colorless viscous oil which is very easily soluble in water while showing a weakly alkaline reaction (pH value about 8.5). The oil is likewise very easily soluble in methanol and ethanol, but sparingly soluble in ether, benzene and methylene-chloride.

Instead of the $AsCl_3$ there can likewise be used with the same success 1 gram of iodine or 5 grams of hydrofluoboric acid (27° Bé.; 2.6% B, 11.6% F) or 3 grams of hydrofluosilicic acid (D=1.3) or 1 gram of sulfur monochloride can be introduced. The hydrofluoboric acid can likewise be introduced in the form of an etherate.

When the reaction products are reacted with 1 mol each of hydrochloric acid, acetic acid and hydrofluoric acid the known tetra-hydroxy-methyl-phosphonium-chloride or the acetate or fluoride are obtained in a very good yield.

We claim:

1. The process for preparing tetra-hydroxy-methyl phosphonium hydroxide which comprises reacting phosphine with formaldehyde, in a molar ratio of about 4:1, in the presence of a small amount of a finely dispersed catalyst selected from the group consisting of (a) the metals of groups IIb and VIII of the periodic system,
    (b) the oxides and the hydroxides of the metals and solid metalloids of groups Ib, IIb, IIIb, IVa, IVb, Va, Vb, VIa and VIII of the periodic system,
    (c) the soluble salts and complex salts of the metals and solid metalloids of groups Ib, IIb, IIIb, IVa, IVb, Va, Vb, VIa and VIII of the periodic system with hydrohalic acids, nitric acid, and sulfuric acid,
    (d) uranyl acetate,
    (e) the phosphides of the metals and metalloids of groups Ib, IIb, IIIb, IVa, IVb, Va, Vb, VIa and VIII of the periodic system, obtained by the reaction of the aforesaid oxides, hydroxides and salts, including uranyl acetate, with phosphine, and
    (f) mixtures of the aforesaid phosphides and the aforesaid salts.

2. The process of claim 1, wherein said catalyst is cadmium chloride.

3. The process of claim 1 wherein said catalyst is mercury-II-chloride.

4. The process of claim 1 wherein said catalyst is platinum-IV-chloride.

5. The process as claimed in claim 1, wherein said reaction is carried out in the presence of water.

6. The process as claimed in claim 1, wherein the reaction is carried out at a temperature between −10° and +40° C.

7. The process as claimed in claim 1, wherein the reaction is carried out at pH-values between about 4 and 8.5.

References Cited in the file of this patent
UNITED STATES PATENTS 2,814,573    Reeves et al. _____ Nov. 26, 1957